United States Patent Office 3,562,288
Patented Feb. 9, 1971

---

3,562,288
HETEROCYCLIC PHOSPHORIC ACID ESTERS, THEIR MANUFACTURE AND USE AS PESTICIDES
Otto Scherer, Bad Soden, Taunus, and Gerhard Stähler, Frankfurt am Main, Germany, assignors to Farbwerke Hoechst Aktiengesellschaft vormals Meister Lucius & Bruning, Frankfurt am Main, Germany, a corporation of Germany
No Drawing. Filed July 16, 1969, Ser. No. 842,330
Claims priority, application Germany, July 20, 1968,
P 17 70 936.3
Int. Cl. C07d 85/22
U.S. Cl. 260—307          7 Claims

---

ABSTRACT OF THE DISCLOSURE

Novel heterocyclic phosphoric acid esters are described as well as their manufacture and use as pesticides. The novel compounds correspond to the general Formula I or II.

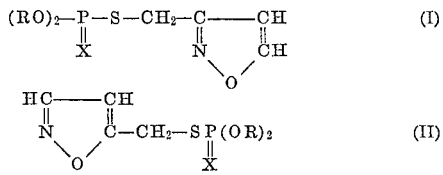

in which R stands for a methyl or ethyl group and X stands for oxygen or sulfur.

---

The present invention relates to heterocyclic phosphoric acid esters, their manufacture and use as pesticidal compositions.

The present invention provides heterocyclic phosphoric acid esters of general Formula I and II

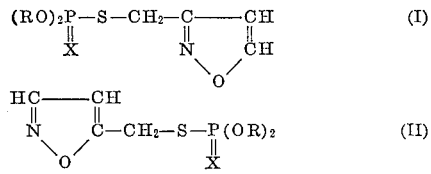

in which R stands for a methyl or ethyl group and X stands for oxygen or sulfur.

The present invention also provides a process for the manufacture of heterocyclic phosphoric acid esters of the general Formula I or II, which compprises reacting O,O-dialkyl-thiophosphates of general Formula III with 3-chloromethyl-isoxazole of Formula IV or with 5-chloromethyl-isoxazole of Formula V according to the following reaction schemes

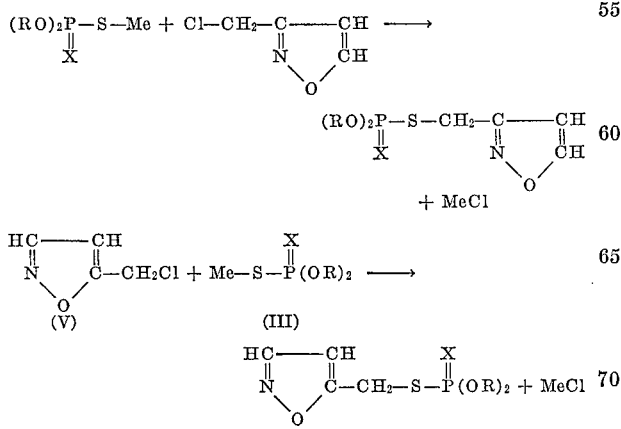

in which Me stands for an alkali metal or an alkaline earth metal or for the ammonium radical and R stands for a methyl or ethyl group and X stands for oxygen or sulfur. The reaction is advantageously carried out in a polar solvent.

The chloromethyl-isoxazoles used as starting materials are obtained by reacting 1,4-dichlorobutene-3-on-2 with hydroxylaminehydrochloride in methanol (v. Kochetkow et al., Chemical Abstracts, 47, 2167 (1953)). A mixture of varying amounts of 3-chloromethyl-isoxazole and 5-chloromethyl-isoxazole is thereby obtained.

For preparing heterocyclic phosphoric acid esters in accordance with the invention, it is not necessary to separate the two isomeric chloromethyl-isoxazoles. They may advantageously be further worked as mixtures.

As inert solvents for the reaction of the chloromethyl-isoxazoles with corresponding O,O-dialkyl-thiophosphates there are advantageously used their polar solvents, for example, methanol, ethanol, propanol, butanol, cyclohexanol, acetone, methyl-ethyl-ketone, aceto-nitrile, dioxane, tetrahydrofuran, toluene, xylene or chlorobenzene.

The present invention further provides pesticidal compositions containing heterocyclic phosphoric acid esters of general Formulae I and II

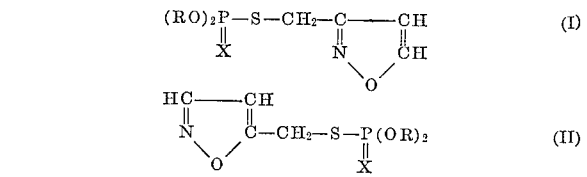

in which R stands for a methyl or ethyl group and X stands for oxygen or sulfur.

Heterocyclic phosphoric acid esters of general Formulae I and II have a very good systemic insecticidal and acaricidal action and, additionally, a good action by contact and in the gaseous phase against insects and acaridae.

In U.S. Pat. 2,759,010 O,O-diethyl-S-2-ethyl-mercaptoethyl-dithiophosphate and in German Pat. 917,668 O,O-diethyl-S-ethyl-mercapto-methyl - dithiophosphate are described as having systemic action against insects and acaridae. However, the use of the said substances requires special precautions because of the high toxicity to warm blooded animals, so that the two known substances can only be used by introducing them into the soil to protect emerging plants.

In contradistinction hereto, the heterocyclic phosphoric acid esters of general Formulae I and II have a considerably reduced toxicity which renders them suitable for being sprayed onto standing plants, for example in the fruit and vegetable culture, without endangering those, who are using them.

The following table shows the toxicites of the heterocyclic phosphoric acid esters in accordance with the invention and, for comparison, the toxicities of two commercial preparations after being administered orally to rats.

TABLE

| Active substance: | $LD_{50}$ rat (p. os), mg./kg. |
|---|---|
| 3- or 5-O,O - dimethyl - dithiophosphoryl-methyl-isoxazole or a mixture of isomers of these two substances in accordance with the invention | 205 |
| 3- or 5 - O,O - diethyl - dithiophosphoryl-methyl-isoxazole or a mixture of isomers of these two substances in accordance with the invention | 13–16 |
| Commercial O,O-diethyl - S-2(ethyl-mercapto)-ethyl-dithiophosphate (I) | 2.1–8 |
| Commercial O,O - diethyl-S-ethyl-mercapto-methyl-dithiophosphate (II) | 3–4 |

The table shows that the toxicity to warm blooded animals of 3-O,O-dimethyl-dithiophosphoryl-methyl-isoxazole and of 5-O,O-dimethyl-dithiophosphoryl-methyl-isoxazole is surprisingly superior to that of the known compounds.

Heterocyclic phosphoric acid esters of general Formulae I and II can be used as active substances in usual admixture with solid and liquid inert carrier materials, adhesives, wetting agents, dispersing agents and grinding auxiliaries in the form of wettable powders, emulsions, suspensiens, dusting powders or granules.

As carrier materials there can be used mineral substances, for example aluminum silicates, argillaceous earths, kaolin, chalks, siliceous chalks, talc, kieselguhr, pumice gravel or hydrated silicic acid, or preparations of the said mineral substances with special additives, for example chalk with sodium stearate.

Suitable carrier materials for liquid proparations are all suitable organic solvents, for example toluene, xylene, diacetone alcohol, cyclohexenone, isphorone, gasolines, paraffin oils, dioxane, dimethyl, formamide, dimethyl sulfoxide, ethyl acetate, butyl acetate, tetrahydrofurane, chlorobenzene, alcohols and glycols with up to 6 carbon atoms.

Suitable adhesives are glutinous cellulose products, or polyvinyl alcohols.

As wetting agents there can be used all suitable emulsifiers, for example oxethylated alkyl phenols, salts of aryl- or alkyl-aryl sulfonic acids, salts of methyl taurine, salts of pheny or methyl kogasin sulfonic acids or soaps.

Suitable dispersing agents are cell pitch (salts of lignin sulfonic acid), salts of naphthalene sulfonic acid and, possibly, hydrated silicic acids or, also, kieselguhr.

As grinding auxiliaries there can be used suitable inorganic or organic salts such as sodium sulfate, ammonium sulfate, sodium carbonate, sodium bicarbonate, sodium thiosulfate, sodium stearate or sodium acetate.

The following examples illustrate the invention, but are not intended to limit it thereto. The examples show the preparation and biological test results of heterocyclic phosphoric acid esters in accordance with the invention.

EXAMPLE 1

24 grams of 3-chloromethyl-isoxazole of a boiling point of 64 to 65° C. under a pressure of 18 mm. mercury and 36 grams of ammonium-dimethyl-dithiophosphate were boiled in 40 milliliters of methanol while stirring. After cooling the precipitated ammonium chloride was filtered by suction. Methanol was removed from the filtrate under reduced pressure. The residue was taken up in 40 milliliters of methylene chloride and shaken with 200 milliliters of water. The separated solution of methylene chloride was dried with 2 grams of anhydrous sodium sulfate and filtered. After removing the solvent from the filtrate by distillation and heating the residue for half an hour on a steam bath at 0.5 mm. Hg., 24 grams if 3-O,O-dimethyl-dithiophosphoryl-methyl-isoxazole were obtained in the form of red oil.

*Analysis.*—Calc'd (percent): N, 5.8; S, 26.8. Found (percent): N, 5.6; S, 27.2.

EXAMPLE 2

24 grams of 5-chloromethyl-isoxazole of a boiling point of 72 to 73° C. under a pressure of 18 mm. mercury and 36 grams of ammonium-dimethyl-dithiophosphate were boiled in 40 milliliters of acetonitrile while stirring. When working up the reaction mixture as described in Example 1, 25 grams of 5-O,O-demethyl-dithiophosphoryl-methyl-isoxazole were obtained in the form of an orange-red oil.

*Analysis.*—Calc'd (percent): N, 5.8; S, 26.8. Found (percent): N, 5.9; S, 27.0.

EXAMPLE 3

240 grams of a mixture of 54% of 3-chloromethyl-isoxazole, 46% of 5-chloromethyl-isoxazole and 360 grams of ammonium dimethyl dithiophosphate were boiled in 400 milliliters of methanol. When working up the reaction mixture as described in Example 1, 270 grams of 3-O,O-dimethyl-dithiophosphoryl-methyl-isoxazole and 5 - O,O - dimethyl - dithiophosphoryl - methyl - isoxazole were obtained as a mixture of both isomers. The isomeric O,O - dimethyl - dithiophosphoryl - methyl - isoxazoles could not even be distilled at 0.05 mm. Hg. without strong decomposition.

*Analysis.*—Calc'd (percent): N, 5.8; S, 26.8. Found (percent): N, 5.4; S, 27.1.

EXAMPLE 4

24 grams of 3-chloromethyl-isoxazole and 41 grams of ammonium-diethyl-dithiophosphate were heated to the boil in 100 milliliters of ethanol. When working up the reaction mixture as described in Example 1, 49 grams of 3-O,O-diethyl-dithiophosphoryl-methyl-isoxazole were obtained in the form of a red oil. By distillation of the raw product 46 grams of 3-O,O-diethyl-dithiophosphoryl-methyl-isoxazole of a boiling point of 130 to 132° C. under a pressure of 0.7 mm. mercury were obtained in the form of a yellow oil.

*Analysis.*—Calc'd (percent): N, 5.2; S, 24.0. Found (percent): N, 5.3; S, 24.2.

EXAMPLE 5

By the reaction of 24 grams of 5-chloromethyl-isoxazole with 48 grams of potassium-diethyl-dithiophosphate in 100 milliliters of ethanol carried out as described in Example 4. 47 grams of 5-O,O-diethyl-dithiophosphoryl-methyl-isoxazole of a boiling point of 136 to 139° C. under a pressure of 0.7 mm. Hg. were obtained.

*Analysis.*—Calc'd (percent): N, 5.2; S, 24.0. Found (percent): N, 5.1; S, 24.3.

EXAMPLE 6

109 grams of a mixture of isomers containing 54% of 3-chloromethyl-isoxazole and 46% of 5-chloromethyl-isoxazole were heated to 90° C. in 40 grams xylene. 200 grams of ammonium-O,O-diethyl-dithiophosphate were added to the mixture while stirring, the temperature dropping to 70° C. After the addition of 20 milliliters of ethanol the temperature of the reaction mixture rose to 95 to 100° C. within five minutes. The reaction mixture was then cooled to room temperature while stirring and subsequently shaken with 250 milliliters of water. The aqueous phase was then separated from the organic phase. After removing xylene from the organic phase at 10 to 20 mm. Hg, 210 grams of a red oil were left from which 195 grams of a mixture of 3-O,O-diethyl-dithiophosphoryl-methyl-isoxazole and of 5-O,O-diethyl-dithiophosphoryl-methyl-isoxazole of a boiling point of 135 to 142° C. under 1 mm. Hg were obtained by distillation under strongly reduced pressure in the form of yellow oil.

*Analysis.*—Calculated (percent): N, 5.2; S, 24.0. Found (percent): N, 5.3; S, 24.5.

EXAMPLE 7

24 grams of 3-chloromethyl-isoxazole and 38 grams of ammonium-O,O-diethyl-thiophosphate were heated to 80 to 85° C. for 5 minutes in 150 milliliters of ethanol while stirring. The reaction mixture was worked up in the manner described in Example 1. 50 grams of 3-O,O-diethyl-thiolophosphoryl-methyl-isoxazole were obtained in the form of a red oil.

*Analysis.*—Calculated (percent): N, 5.5; S, 12.6. Found (percent): N, 5.9; S, 12.3.

EXAMPLE 8

24 grams of 5-chloromethyl-isoxazole and 38 grams of ammonium-O,O-diethyl-thiophosphate were treated in the manner described in Example 7. 50 grams of 5-O,O-diethyl-thiolophosphoryl-methyl-isoxazole were obtained in the form of a red oil.

Analysis.—Calculated (percent): N, 5.5; S, 12.6. Found (percent): N, 5.7; S, 12.4.

EXAMPLE 9

24 grams of a mixture of 54% of 3-chloromethyl-isoxazole and 46% of 5-chloromethyl-isoxazole in 150 milliliters of ethanol were reacted with 38 grams of ammonium-O,O-diethyl-thiophosphate as described in Example 7. 49 grams of a mixture of isomeric 3-O,O-diethyl-thiolophosphoryl - methyl - isoxazole and 5-O,O-diethyl-thiolophosphoryl-methyl-isoxazole were obtained in the form of a red oil.

Analysis.—Calculated (precent): N, 5.5; S, 12.6. Found (percent): N, 5.3; S, 13.0.

EXAMPLE 10

When sowing horse beans (Vicia faba) a granular product was admixed with the seeds which contained 10% of 3-O,O-diethyl-dithiophosphoryl-methyl-isoxazole, 10% of 5-O,O-diethyl-dithiophosphoryl-methyl-isoxazole or 10% of an isomer mixture of both active substances on pumice gravel (granulated pumice stone with a grain size of 0.5 to 2 millimeters) as carrier material, using an amount of 3 kilograms active substance per hectare. After emerging the plants were infested with plant-lice (Doralis fabae) at intervals of a week. Up to 8 weeks after sowing the plant-lice on the plants protected by the granular products were completely destroyed, while plants, which had been infested in the manner, but had not been treated with the granular products, were strongly attacked by plant-lice and their growth was considerably retarded.

EXAMPLE 11

Horse beans (Vicia faba) and dwarf-bush beans (Phaseolus vulgaris) were provided with a cotton bandage on the stem about 1 centimeter above the ground, which bandage was enveloped with a plastic film and contained 0.25 milligram of 3-O,O-diethyl-dithiophosphoryl-methyl-isoxazole, 0.25 milligram of 5-O,O-diethyl-dithiophosphoryl-methyl-isoxazole or 0.25 milligram of a mixture of the said two active substances, or the same amount of 3-O,O-dimethyl-dithiophosphoryl-methyl-isoxazole, 5-O,O-dimethyl-dithiophosphoryl-methyl-isoxazole or a mixture of the said active substances in fine and uniform distribution. The plant-lice (Doralis fabae) sucking on the upper parts of the plants were completely destroyed within 8 hours, after having applied the bandage, by the active substance, which was systemically conveyed.

EXAMPLE 12

Emulsion concentrates of the following compositions were prepared: 10% of active substance, 85% of xylene, 3% of the calcium salt of dodecyl-benzene-sulfonic acid, 2% of oxethylated alkyl phenol. As active substances according to the invention there were used: 3-O,O-diethyl-dithiophosphoryl-methyl-isoxazole, 5-O,O - diethyl-dithiophosphoryl-methyl-isoxyzole, or a mixture of the said active substances as well as 3-O,O-dimethyl-dithiophosphoryl-methyl-isoxazole, 5-O,O-dimethyl-dithiophosphoryl-methyl-isoxazole, or a mixture of the said active substances. From the emulsion concentrates so obtained aqueous emulsions were prepared with which horse beans (Vicia faba) in pots were treated in a manner such that 1 milligram of the active substance per kilogram of soil was distributed in the soil environing the roots of the plants. The plants were infested with plant-lice (Mycodes persicae).

The active substance reached the upper parts of the plants systemically via the roots. The plant-lice in the upper parts of the plants were completely destroyed within 8 hours.

EXAMPLE 13

Small mandarin trees in pots infested with scale insects (Pseudococcus citri) were sprayed with a 0.003% aqueous emulsion of 3-O,O-dimethyl-dithiophosphoryl-methyl-isoxazole, 5-O,O-dimethyl-dithiophosphoryl-methyl-isoxazole or a mixture of the said active substances. The emulsion concentrates of Example 12 served for the preparation of the emulsion.

The scale insects and their eggs were completely destroyed within 24 hours.

EXAMPLE 14

A wettable powder of the following composition was prepared: 30% of active substance, 40% of finely dispersed silicic acid, 10% of the sodium salt of a di-naphthylmethane-disulfonic acid, 2% of the sodium salt of naphthyl-sulfonic acid, 0.3% of sodium-oleyl-methyl-tauride, 17.7% of diatomaceous earth. As active substances in accordance with the invention there were used: 3-O,O-dimethyl-dithiophosphoryl - methyl - isoxazole, 5-O,O-dimethyl-dithiophosphoryl - methyl - isoxazole or a mixture of the said active substances. The wettable powders were made into a 0.1% aqueous emulsion which was sprayed on bean plants (Phaseolus vulgaris) infested with spider mites (Tetranychus urticae) of all stages of development. The spider mites and their eggs were completely destroyed within 3 days.

EXAMPLE 15

From the emulsion concentrates of Example 12 aqueous emulsions of 0.025% strength were prepared and sprayed on plant bugs (Oncopeltus fasciatus) in a container in a manner such that a thin coating of active substance formed on their integument. Subsequently the plant-bugs were placed on untreated young cotton plants in gauze cages. The plant bugs were completely destroyed within 24 hours by contact action.

EXAMPLE 16

A paper filter was impregnated with an actonic solution of 3-O,O-dimethyl-dithiophosphoryl - methyl-isoxaole, 5-O,O-dimethyl-dithiophosphoryl-methyl-isoxaole or a mixture of the said active substances and subsequently suspended in a glass bell of a capacity of 24 liters, in which a bean plant (Vicia faba) infested with plant-lice (Doralis fabae) was placed in a manner such that it did not come into contact with the filter. After some time there was a content of 0.00375 milligram of active substance per liter of air in the glass bell by which the plant-lice on the plant were completely detsroyed within 48 hours.

EXAMPLE 17

In a manner analogous to Example 12 horse beans (Vicia faba) in pots were treated with an aqueous emulsion of a mixture of isomeric 3-O,O-diethyl-thiolophosphorylmethyl-isoxazole and 5 - O,O - diethyl-thiolophosphorylmethyl-isoxaole in a manner such that 1 milligram per kilogram of soil of the mixture of isomeric active substances in accordance with the invention was distrilented in the soil surrounding the roots of the plants. The root balls were enveloped with a bag of plastic film to avoid a possible action via the gaseous phase. The plants were infested with plant-lice (Doralis fabae). The active substance reached the upper parts of the plants systemically via the roots. The plant-lice in the upper parts of the plants were completely destroyed within 8 hours.

What is claimed is:
1. A heterocyclic phosphoric acid ester selected from the group consisting of (I) and (II)

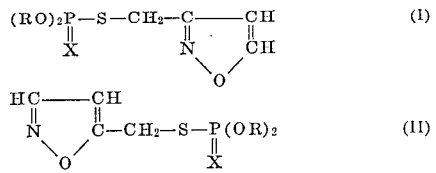

in which R stands for a methyl or ethyl group and X stands for oxygen or sulfur.
2. 3-O,O-dimethyl-dithiophosphoryl-methylisoxazole
3. 5-O,O-dimethyl-dithiophosphoryl-methyl-isoxazole
4. 3-O,O-diethyl-dithiophosphoryl-methyl-isoxazole
5. 5-O,O-diethyl-dithiophosphoryl-methyl-isoxazole
6. 3-O,O-diethyl-thiolophosphoryl-methyl-isoxazole
7. 5-O,O-diethyl-thiolophosphoryl-methyl-isoxazole

References Cited
UNITED STATES PATENTS 3,232,830   2/1966   Schrader et al. _____ 167—22

ALEX MAZEL, Primary Examiner

R. V. RUSH, Assistant Examiner

U.S. Cl. X.R.

424—272